May 5, 1953  S. L. GRAHAM ET AL  2,637,293
SOUND PRODUCING DEVICE
Filed Aug. 31, 1950
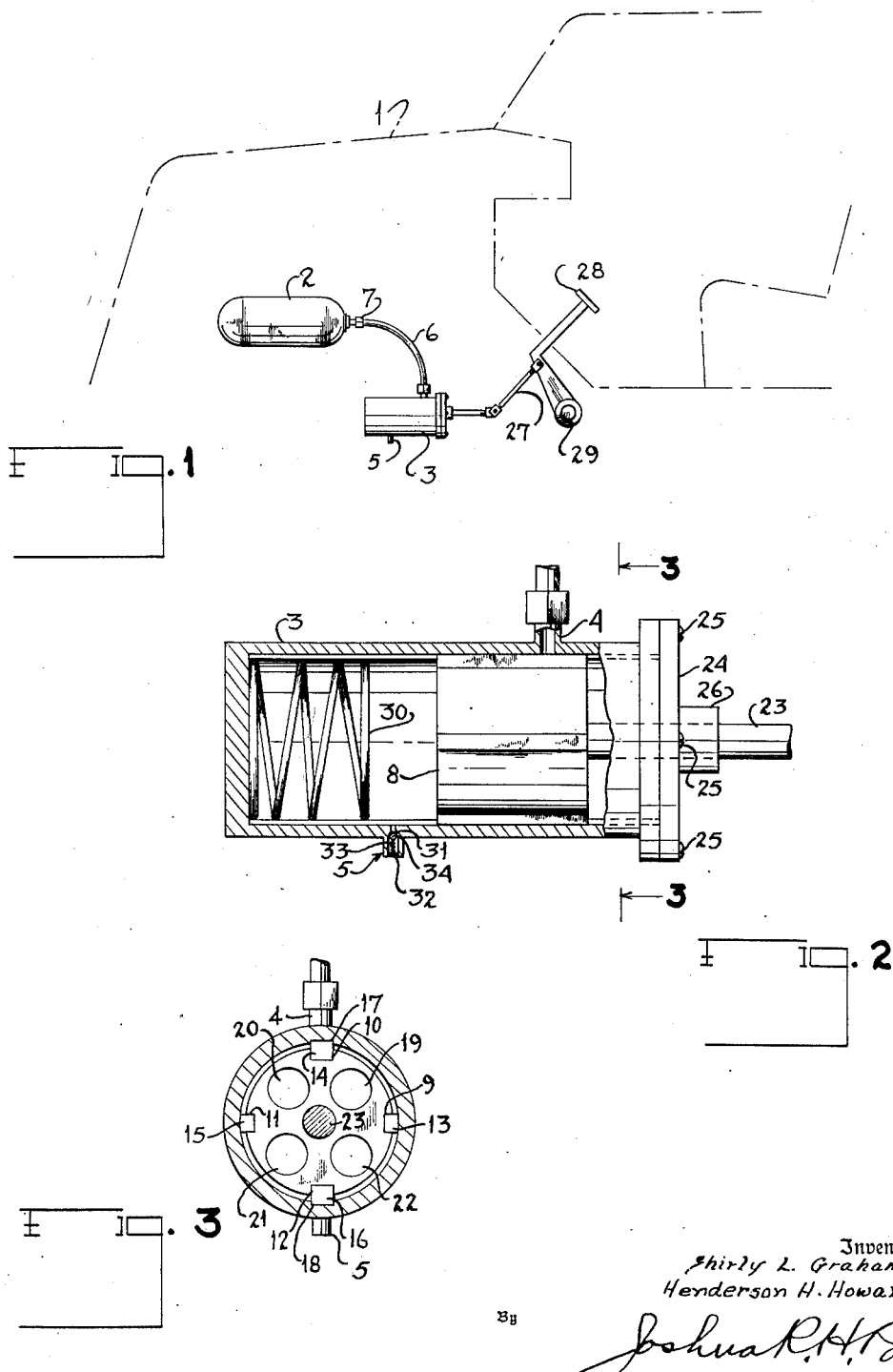
Inventors,
Shirly L. Graham &
Henderson H. Howard
By Joshua R. H. Potts
Their Attorney Patented May 5, 1953

2,637,293

UNITED STATES PATENT OFFICE 2,637,293

SOUND PRODUCING DEVICE

Shirly L. Graham, Ellicott City, and Henderson H. Howard, Simpsonville, Md.

Application August 31, 1950, Serial No. 182,592

4 Claims. (Cl. 116—28)

This invention relates to sound producing devices and more particularly to a sound producing device wherein the sound is produced by the release of air under pressure.

Heretofore in the art it will be seen that devices to simulate an ambulance or police siren are old. Thus, a toy siren may be attached to a bicycle and rotated by one of the wheels of the bicycle to produce the sound of a siren. Further, horns of standard size automobiles have been reduced in size and duplicated in design and applied to toy vehicles to simulate the sound of the horn used on the standard size automobile.

Proceeding toward the present invention, the brakes on automobiles, and motorcycles and other vehicles, are usually of the silent type; that is, when the brakes are applied no sound results from the brake mechanism itself. However, in many transportation trucks air brakes are used, and upon applying such type of brake a hissing sound is produced which results from the operation of the air brake mechanism itself. So, the present invention deals with a sound producing device which will simulate the sound of an air brake.

An object of the present invention is to provide a sound producing device for simulating the sound of an audible signal.

Another object of the present invention is to provide a device to simulate the sound of an air brake, which sound results from the operation of the air brake mechanism itself at the time of the application of said air brake.

Another object of the present invention is to provide a sound producing device which may be operatively connected to the brake pedal of a vehicle.

Another object of the present invention is to provide a sound producing device which may be operatively connected to the brake pedal of a vehicle to produce a sound upon the release of the brake pedal, the latter being in a depressed position.

A further object of the present invention is to provide a sound producing device which is sturdy and durable in construction, reliable and efficient in operation, and which is simple and inexpensive to manufacture.

Other objects and advantages will be apparent from the following description taken in conjunction with the accompanying drawing.

The invention therefore has to do with a sound producing device comprising a closed casing having an inlet adapted to be connected to a source of air under pressure and an outlet, and a follower positioned within the casing for slidable movement therein and adapted to be connected to an actuating means.

For a full and more complete understanding of the device of the present invention reference may be had to the following detailed description and accompanying drawing wherein:

Figure 1 is a perspective view of the device of the present invention and showing the same mounted in a motor vehicle ready for operation;

Figure 2 is a side elevational view of a portion of the sound producing device shown in Figure 1 and showing the casing partly in section and partly broken away to expose the mechanism inside the casing, and the connections to the casing being broken away; and Figure 3 is a view taken on the line 3—3 of Figure 2.

Referring specifically to the drawing, wherein the same reference characters are used throughout the several views to designate the same or similar parts, the numeral 1 designates an automobile or motor vehicle. The sound producing device of the present invention is shown mounted in the motor vehicle 1.

The device comprises a tank 2 which is adapted to contain compressed air and which forms a source of air under pressure. This tank 2 may be fixedly secured to the frame of the motor vehicle 1 at a point just below the hood (not shown). The numeral 3 designates a closed casing or valve housing or cylinder. The casing 3 is provided with an inlet 4 which is located at a point adjacent to and spaced from one end of the casing 3. Further, an outlet 5 is provided in the casing 3, said outlet being located at a point adjacent to and spaced from the other end of the casing 3. The pressure tank 2 is brought into communication with the inlet 4 by means of a conduit or line 6 which has one end connected to the inlet 4 and which has a valve 7 on its other end which is connected to the pressure tank 2. As previously pointed out, the pressure tank 2 provides air under pressure into the casing 3 through the inlet 4.

A follower or valve plunger or piston 8 is positioned in the casing 3 for reciprocatory movement therein. The piston 8 has a plurality of longitudinally extending grooves 9, 10, 11 and 12 therein, which extend the entire length of the piston 8, the grooves 9, 10, 11 and 12 being arranged in equal radially spaced relation about the periphery of the piston 8. A plurality of bars or ribs 13, 14, 15 and 16 are fixedly secured in the grooves 9, 10, 11 and 12 respectively in the piston 8. The casing 3 also has a plurality of grooves 17 and 18 which are adapted to slidably receive the bars or ribs 14 and 16, respectively.

It will be noted that the bars or ribs 14 and 16 are arranged directly opposite each other. Further, it will be noted that the bars 14 and 16 are arranged over the inlet 4 and the outlet 5, respectively, the bars 14 and 16 being adapted to open and close the inlet 4 and the outlet 5, respectively. The piston 8 has a plurality of openings 19, 20, 21 and 22 extending entirely through the piston 8. A piston rod 23 is fixedly secured to one end of the piston 8 and projects out of one end of the casing 3. A closure cap 24 is circumposed about the piston rod 23 and is adapted to close one end of the casing 3, said closure cap being secured to the casing 3 by means of screws 25. A collar 26 is circumposed about the piston rod 23 and is integrally secured to the closure cap 24, the collar 26 being adapted to contain packing or sealing means to prevent the escape of air from the casing 3 around the piston rod 23.

A connecting rod 27 has one of its ends pivotally connected to the projecting end of the piston rod 23. A conventional or standard brake pedal 28 is shown mounted in the motor vehicle 1 in Figure 1, the brake pedal being adapted to move about a pivot shaft 29. The other end of the connecting rod 27 is pivotally connected to the brake pedal 28.

Mode of operation

The device of the present invention operates as follows:

Upon applying pressure on the brake pedal 28, the same is forced into a depressed position. The depression of the brake pedal 28 transmits force through the connecting rod 27 and onto the piston rod 23 to move the piston 8 away from one end of the casing 3 and toward the other end thereof. This results in the sliding of the bar or rib 14 over the inlet 4 until the inlet 4 is uncovered, and then air under pressure is forced into the casing 3 from the pressure tank 2. At the same instant the inlet 4 is uncovered by the bar or rib 14, the outlet 5 is covered by the bar or rib 16 to prevent air from leaving the casing 3. Thus, it will be seen that air under pressure has been admitted into the casing 3, which air under pressure goes through the openings 19, 20, 21 and 22 into the opposite end of the casing 3. Upon the brake pedal 28 being released, the brake pedal will return to its normal position, and at the same time the brake pedal pulls the piston 8 toward the opposite end of the casing 3 to simultaneously close the inlet 4 and open the outlet 5. It is to be noted that as soon as the inlet 4 is closed and the outlet 5 is opened, the air under pressure within the casing 3 goes out the outlet 5 to produce a hissing sound and therefore to simulate the sound of an air brake used on transportation trucks or other motor vehicles.

A resilient means or coil spring 30 may be positioned within the casing 3, one end of the resilient means or spring 30 being secured to one end of the casing 3 while the other end of the resilient means freely projects towards the other end of the casing 3. The purpose of the resilient means is to exert pressure on the piston 8 to speed up its movement toward the opposite end of the casing 3 upon the brake pedal 28 being released. A valve comprising a valve seat 31, and a support 32 provided with openings therein, may be mounted in the outlet 5. Secured to the support 32 is one end of a coil spring 33, a ball 34 being positioned on the free end of the coil spring and normally resting against the valve seat. Upon reaching a predetermined pressure within the casing 3, such pressure will overcome resistance of the spring 33 to open the valve. The sole purpose of the ribs or bars 13, 14, 15, and 16 is to permit more free circulation of the air within the casing 3. The grooves in the casing and the grooves in the piston could be omitted and the bars or ribs omitted. This would result in the periphery of the piston and the inner surface of the casing 3 being smooth. It is to be emphasized that the inlet 4 must close at approximately the same instant that the outlet 5 is opened, and vice versa.

The above description hereinbefore set forth is merely the best mode of practicing the present invention, as there are many modifications and slight deviations still within the spirit and scope of the present invention which are too numerous to mention. It is the applicants' intention to include every modification of, and deviation from, the present invention that is within the length, breadth, and scope of the appended claims.

What is claimed is:

1. In a sound producing device adapted to be connected to the brake pedal of a motor vehicle, a source of supply of fluid under pressure, a cylindrical casing having closed ends, the cylindrical wall of said casing being formed with an inlet on one side and an outlet on the other side offset with respect to said inlet, a conduit connecting said source of supply to said inlet, means at said outlet for creating a hissing sound when fluid escapes therethrough, a follower slidably mounted in said casing and dimensioned and arranged to close one of said inlet or outlet while the other remains open, said follower being formed with a longitudinal air passage extending therethrough and establishing communication between the spaces at the opposite end of said casing as defined by said follower, and actuating means connecting said follower to said brake pedal.

2. In a sound producing device adapted to be connected to the brake pedal of a motor vehicle, a source of supply of air under pressure, a cylindrical casing having closed ends, the cylindrical wall of said casing being formed with an inlet on one side and an outlet on the other side offset with respect to said inlet, a conduit connecting said source of supply to said inlet, means at said conduit for creating a hissing sound when air escapes therethrough, and a piston-like follower slidably mounted in said casing and having end faces, said follower being formed with an air passage communicating between said end faces, said follower being dimensioned and arranged to close one of said inlet and outlet while the other is opened, and actuating means extending through one end of said casing and operatively connecting said follower to said brake pedal.

3. In a sound producing device adapted to be connected to the brake pedal of a motor vehicle, a source of supply of air under pressure, a cylindrical casing having closed ends, the cylindrical wall of said casing being formed with an inlet on one side and an outlet on the other side offset with respect to said inlet, a conduit connecting said source of supply to said inlet, means at said outlet for creating a hissing sound when air escapes therethrough, and a piston-like follower slidably mounted in said casing and having end faces, said follower being formed with an air passage communicating between said end faces, said follower being dimensioned and arranged to close one of said inlet and outlet while the other is opened, actuating means extending through one end of said casing and operatively connecting said follower to said brake pedal, and spring means at the other end of said casing normally urging said follower away therefrom.

4. In a sound producing device adapted to be connected to the brake pedal of a motor vehicle, a source of supply of air under pressure, a cylindrical casing having closed ends, the cylindrical wall of said casing being formed with an inlet on one side and an outlet on the other side offset with respect to said inlet, a conduit connecting said source of supply to said inlet, means at said outlet for creating a hissing sound when air escapes therethrough, and a piston-like follower slidably mounted in said casing and having end faces, said follower being formed with air passages communicating between said end faces, said follower being dimensioned and arranged to close one of said inlet and outlet while the other is opened, actuating means extending through one end of said casing and operatively connecting said follower to said brake pedal, the inner face of the cylindrical wall of said casing and the outer cylindrical face of said follower being formed with meeting grooves, and ribs received in said grooves with the ribs being secured to said follower.

SHIRLY L. GRAHAM.
HENDERSON H. HOWARD.

References Cited in the file of this patent

UNITED STATES PATENTS

| Number | Name | Date |
|---|---|---|
| 49,433 | Johnson | Feb. 15, 1910 |
| 1,017,938 | Williamson | Feb. 20, 1912 |
| 1,023,467 | Gilkeson | Apr. 16, 1912 |
| 1,187,693 | Woolley | June 20, 1916 |

FOREIGN PATENTS

| Number | Country | Date |
|---|---|---|
| 236,871 | Germany | July 31, 1911 |